United States Patent [19]

Isaka et al.

[11] 4,070,417

[45] Jan. 24, 1978

[54] STRETCHED POLYESTER FILM FROM A POLYMER BLEND

[75] Inventors: Tsutomu Isaka; Hiroshi Nagano, both of Inuyama; Tetsushi Murakami, Otsu; Koichi Matsunami, Otsu; Yukio Yamane, Otsu, all of Japan

[73] Assignee: Toyobo Co., Ltd., Osaka, Japan

[21] Appl. No.: 642,184

[22] Filed: Dec. 18, 1975

[30] Foreign Application Priority Data

Dec. 19, 1974 Japan .............................. 49-146537

[51] Int. Cl.$^2$ ............................................. C08L 67/02
[52] U.S. Cl. ................................ 260/860; 260/75 T; 264/288; 264/289
[58] Field of Search ............... 264/288, 289; 260/860, 260/75 R, 75 T

[56] References Cited

U.S. PATENT DOCUMENTS

| | | | |
|---|---|---|---|
| 3,177,277 | 4/1965 | Adams et al. | 264/289 X |
| 3,256,379 | 6/1966 | Heffelfinger | 264/289 |
| 3,701,755 | 10/1972 | Sumoto et al. | 260/75 R |
| 3,903,294 | 9/1975 | Abella | 264/289 |
| 3,915,933 | 10/1975 | Kohno et al. | 264/289 X |
| 3,917,743 | 11/1975 | Schroeder et al. | 260/860 |
| 3,968,183 | 6/1976 | Hayashi et al. | 260/860 |

*Primary Examiner*—Lucille M. Phynes
*Attorney, Agent, or Firm*—Birch, Stewart, Kolasch and Birch

[57] ABSTRACT

A transparent polyester film having excellent printability, flexing resistance and pinhole resistance and further excellent interlaminar strength, which is made from a polymer mixture or blend comprising (i) a polyester consisting essentially of a residue of dibasic acids wherein at least 80 % by mol is terephthalic acid and a residue of at least one glycol and (ii) a block copolyester consisting of a crystalline polyester (hard) segment having a high melting point and a soft polymer segment having a low melting point and a number average molecular weight of 400 to 8,000, said soft polymer segment having a low melting point being contained in an amount of 0.5 to 10 % by weight on the basis of the whole weight of the polymer mixture or blend, and said crystalline polyester segment having a melting point of at least 170° C when a polymer is produced by the monomers composing the segment alone and said soft polymer segment having a melting or softening point of 100° C or lower.

14 Claims, No Drawings

STRETCHED POLYESTER FILM FROM A POLYMER BLEND

The present invention relates to a polyester film, more particularly, a transparent polyester film having excellent printability, flexing resistance and pinhole resistance and further excellent interlaminar strength against external force.

There have recently been required improved materials suitable for packaging of foods and industrial parts, protecting films, or the like. In the field of the packaging of foods, the packaging materials have been rechecked from the hygienic points such as non-odorousness or the residual solvent, and the selection of suitable printing ink and the good drying characteristic thereof have become important. Accordingly, it has been desired that the packaging materials can be rapidly printed with the conventional printing inks for the cellulose films. Besides, the layer of the printing ink should not be peeled off by the boiling-water treatment. In the packages which bear with the treatment under severe conditions, such as vacuum packaging, retort packaging (i.e. packaging suitable for the sterilization at a high temperature and a high pressure), or frozen food packaging, the conventional polyester films are not necessarily suitable as the packaging material. That is, the packaging bag has a corner or a projection, by which the polyester film is deformed, and further the polyester film becomes brittle by the treatment at a low temperature, which result in the break of the package and the contents can not be sufficiently protected. Besides, the pinholes occur in the packaging material by the external force and further, in case of the printed film, the layer of the printing ink is peeled off from the base film and the heat-sealing layer laminated thereon is peeled off, and as the result, the film loses the protecting functions. Moreover, it is known that polyamide films have excellent toughness at room temperature and under normal conditions but the excellent properties are deteriorated by the treatment under the severe conditions, such as the boiling-water treatment or the retort treatment at a high temperature and a high pressure, and can not exhibit the protecting functions.

Under the circumstances, the present inventors have intensively studied to find an improved film suitable for the packaging material having no defects as mentioned above. As the result, it has been found that a polyester film comprising a specific polyester and a specific block copolyester shows the desirable properties and is suitable as the packaging material. Moreover, it has been found that the specific polyester film has an excellent printability and can be printed with a conventional printing inks for cellulose films, in other words, the polyester film can be printed without using such a specific ink as used for the conventional polyester films.

An object of the present invention is to provide an improved transparent polyester film having excellent printability, flexing resistance and pinhole resistance.

Another object of the invention is to provide a polyester film suitable for the packaging of foods or other materials, which is drawn uniaxially or biaxially.

A further object of the invention is to provide a polyester film having a print layer.

A still further object of the invention is to provide a polyester film laminate having excellent printability.

These and other objects of the invention will be apparent from the description hereinafter.

The polyester film of the present invention is made from a polymer mixture or blend comprising (i) a polyester consisting of a residue of dibasic acids wherein at least 80% by mol is terephthalic acid and a residue of glycols and (ii) a block copolyester consisting of a crystalline polyester (hard) segment having a high melting point and a soft polymer segment having a low melting point and a number average molecular weight of 400 to 8,000, said soft polymer segment having a low melting point being contained in an amount of 0.5 to 10% by weight on the basis of the whole weight of the polyer mixture or blend.

The polyester consists of a residue of dibasic acids wherein at least 80% by mol is terephthalic acid and a residue of glycols, which may be referred to "terephthalic polyester" hereinafter. Thus, the dibasic acid residue of the polyester comprises predominantly terephthalic acid residue, and less than 20% by mol thereof may be a residue of one or more other dibasic acids, such as isophthalic acid, phthalic acid, adipic acid, sebacic acid, succinic acid or oxalic acid, or may be a residue of an oxyacids, such as p-hydroxybenzoic acid. The glycol residue may be a residue of the conventional alkylene glycols, such as ehtylene glycol, propylene glycol, trimethylene glycol, tetramethylene glycol, hexamethylene glycol, or cyclohexanedimethanol, preferably ethylene glycol or tetramethylene glycol.

The block copolyester consists of a crystalline polyester segment having a high melting point and a soft polymer segment having a low melting point and a number average molecular weight (hereinafter, referred to as merely "molecular weight") of 400 to 8,000, said crystalline polyester segment having a melting point of at least 170° C when a polymer is produced by the monomers composing the segment alone and said soft polymer segment having a melting or softening point of 100° C or lower.

The crystalline polyester segment having a high melting point has a melting point of at least 170° C when a polymer having fiber-forming properties is produced by the monomer composing the segment alone, and may be a segmennt of a polyester consisting of a residue of aromatic dicarboxylic acids (e.g. terephthalic acid, isophthalic acid, 1,5-naphthalenedicarboxylic acid, or 2,6-naphthalenedicarboxylic acid) and a residue of aliphatic, aromatic or alicyclic diols (e.g. ethylene glycol, propylene glycol, tetramethylene glycol, pentamethylene glycol, 2,2-dimethyltrimethylene glycol, hexamethylene glycol, p-xylylene glycol, or cyclohexanedimethanol); a segment of a copolyester containing a residue of oxyacids [e.g. p-($\beta$-hydroxyethoxy)benzoic acid, or p-hydroxybenzoic acid] in addition to the residues of the dicarboxylic acids and the glycols above-mentioned; a segment of a polyether ester consisting of a residue of aromatic ether dicarboxylic acid [e.g. 1,2-bis(4,4'-dicarboxymethylphenoxy)ethane, or di(4-carboxyphenoxy)ethane] and a residue of the diols as mentioned above; or a segment of a polyamidoester consisting of a residue of aromatic amidodicarboxylic acids [e.g. bis(N-p-carbethoxyphenoxy)terephthalimide] and a residue of the diols as mentioned above.

The soft polymer segment having a low melting point and a molecular weight of 400 or more is substantially in the non-crystalline state in the polyester block copolymer and has a melting or softening point of 100° C or lower when it is measured on the segment alone. The molecular weight of the soft polyester segment is usually 400 to 8,000. When the molecular weight is less than 400, the block copolyester thus obtained has a too low melting point and shows too large adhesion, which results in the interior processability into a film and further does not give the desired impact resistance and pinhole resistance to the polyester. On the other hand, when the molecular weight is more than 8,000, the phase of the non-crystalline polymer segment having a low melting point is separated, and as the result, the block copolyester shows an extremely high melting viscosity and becomes hard and brittle. Accordingly, after the copolymerizaton reaction, the block copolyester thus obtained can hardly be taken out from the reaction vessel, and further when the block copolyester is used, the polyester film shows an inferior transparency. Preferred molecular weight of the soft polymer segment is from 700 to 6,000.

The soft polymer segment having a low melting point and a molecular weight of 400 to 8,000 is contained in the polyester block copolymer in the ratio of 5 to 95% by weight. When the ratio of the soft polymer segment is less than 5% by weight, the film obtained from the block copolymer containing such a soft polymer segment and the terephthalic polyester shows insufficient impact resistance and pinhole resistance, and therefore, a large amount of the block copolymer should be used. On the other hand, the block copolyester containing more than 95% by weight of the soft polymer segment is sticky and shows undesirable blocking property and is hardly admixed with the terephthalic polyester and further gives undesirable effect on the transparency of the film. Preferred ratio of the soft polymer segment having a low melting point ranges particularly from 10 to 90% by weight. The components composing the soft polymer segment may be a polyether (e.g. polyethylene oxide glycol, polypropylene oxide glycol, polytetramethylene oxide glycol, a glycol copolymer of ethylene oxide and propylene oxide, or a glycol copolymer of ethylene oxide and tetrahydrofuran), an aliphatic polyester (e.g. polyneopentyl azelate, polyneopentyl adipate, or polyneopentyl sebacate), or a polylactone (e.g. poly-e-caprolactone, or polypivarolactone).

The block copolyesters can be produced by the conventional polycondensation methods.

Suitable compounds of the block copolyester used in the present invention are polyethylene terephthalate-polyethylene oxide block copolymer, polytetramethylene terephthalatepolyethylene oxide block copolymer, polyethylene terephthalatepolytetramethylene oxide block copolymer, polytetramethylene terephthalate-polytetramethylene oxide block copolymer, polyethylene terephthalate-polyethylene oxide.polypropylene oxide block copolymer, polyethylene terephthalate-poly-E-caprolactone block copolymer, polytetramethylene terephthalate-poly-E-caprolactone block copolymer, polyethylene terephthalate-polypivarolactone block copolymer, polyethylene terephthalate-polyethylene adipate block copolymer, polyethylene terephthalate-polyneopentyl sebacate block copolymer, polytetramethylene terephthalatepolyethylene dodecanate block copolymer, polytetramethylene terephthalate-polyneopentyl dodecanate block copolymer, a block copolymer of a polyester made from di(4-carboxyphenoxy)ethane and ethylene glycol with polyethylene glycol, or a block copolymer of a polyester made from bis(N-p-carboxyethoxyphenyl)adipamide and ethylene glycol with polyethylene glycol.

The polyester film of the present invention is produced by blending the terephthalic polyester with the block copolyester containing the non-crystalline polymer segment having a low melting point, forming a film from the resulting polymer mixture or blend and drawing the resultant uniaxially or preferably biaxially. In the polymer mixture or blend for producing the polyester film, the non-crystalline polymer segment having a low melting point is contained totally in the range of 0.5 to 10% by weight, preferably 0.5 to 5% by weight. When the content is less than 0.5% by weight, it does not show the sufficient effect, and on the other hand, when the content is more than 10% by weight, the effect thereof does not increase and rather it shows an adverse result, such as the decrease of the transparency and other physical properties of the film. When the content of the soft polymer segment having a low melting point is in the suitable range as mentioned above in the polymer mixture or blend of the terephthalic polyester and the block copolyester, the mixed ratio of the terephthalic polyester and the block copolyester is not limited, but the mixed ratio thereof may be usually in the range of 99.4 : 0.6 to 20 : 80 by weight (terephthalic polyester : block copolyester). Preferred range is 99.4 : 0.6 to 30 : 70 by weight from the standpoint of that the change of the dynamic properties of the film from that of the film made from the terephthalic polyester alone is minimized.

The blending of the terephthalic polyester with the block copolyester can be carried out by various methods, for instance, by adding the block copolyester to the polymerization reaction system of the terephthalic polyester when the polymerization reaction is finished, by blending the terephthalic polyester chips and the block copolyester chips with a blender, or by adding the block copolyester to the terephthalic polyester immediately before the forming of the film, or by combining these methods. The polymer mixture or blend thus blended is then formed into a film by the conventional film-forming methods, for instance, T-die method, or inflation method, by which a non-drawn film is formed. The desired polyester film of the present invention can be produced by drawing the non-drawn film at least uniaxially, preferably biaxially, by which the excellent properties thereof are more effectively given to the film. The drawing may be carried out at a similar range of the temperature as that in the drawing of the conventional terephthalic polyester, but when the block copolyester is blended in a high ratio, the temperature may be varied appropriately. The drawing temperature useful in the present invention is usually 70° to 100° C. This drawing of the film is the most important factor for obtaining the desired polyester film having excellent properties, and the film should be at least uniaxially drawn and the biaxially drawn film is particularly desirable. The draw ratio is not specifically limited, but it is usually 1.2 to 6 times, preferably 1.5 to 6 times in cases of the uniaxial drawing and is perpendicularly 1.2 to 6 times and laterally 1.2 to 6 times in case of the biaxial drawing. The non-drawn film is not suitable as the packaging material and does not show the excellent properties even by the incorporation of the block copolyester.

The polyester film of the present invention is characteristic in its excellent printability, that is, the present polyester film can be printed with the conventional printing ink for cellulose films at a high speed. When the conventional polyester films, for instance polyethylene terephthalate film is printed with the printing ink for cellulose films, the adhesion of the film with the printing ink is inferior and the printing ink layer is peeled off from the polyester film. Accordingly, in case of the conventional polyester film, it is required to use a specifically formulated printing ink. On the contrary, the polyester film of the present invention can be printed with the commercially available printing ink for cellulose films wherein cellulose derivatives such as nitrocellulose, methylcellulose, ethylcelullose, hydroxyethylcellulose or cellulose acetate are used as the binder.

The printing ink useful for the present polyester film contains the above-mentioned binder which may be incorporated with other binder, such as polyamide resins, synthetic rubbers, rosins, ester gums (e.g. glycerol ester), urea resins, or melamine resins. The printing ink contains inorganic or organic pigments or dyestuffs, such as titanium white, chrome yellow pigment, copper powder, phthalocyanine blue, or the like, which may be selected in accordance with the desired color. These components are admixed with a suitable organic solvent, such as aromatic hydrocarbons, alcohols, esters, ketones or the like (e.g. benzene, toluene, xylene, or ethyl acetate), whereby the viscosity of the mixture is controlled. The printing ink may also contain volatile varnish or the like as the vehicle. The printing ink may further contain an appropriate amount of other ingredients, such as stabilizers, plasticizers, weathering agents, natural resins, rubber derivatives, lubricants, or gloss agents.

The printing ink may be applied to the polyester film in an amount of 0.05 to 15 $g/m^2$, preferably 0.1 to 5 $g/m^2$. Prior to the application of the printing ink, the polyester film may be subjected to the surface treatment, such as corona discharge treatment, flame treatment, or treatment with an acid, by which the polyester film shows more excellent adhesion with the printing ink.

In the printed polyester film, the printing ink is firm adhered with the film. The application of the printing ink can be carried out by the conventional methods for printing the cellulose films, for instance, various roll coating methods (e.g. rotogravure roll method, or reverse roll method), a blade coating method, a dip coating method, a spray coating method, a flexographic printing method, or the like.

In the field of packaging of food, the package is usually subjected to boiling treatment or hot-water treatment, and hence, when the conventional polyester film with a printing ink layer is subjected to the boiling treatment, the printing ink layer is peeled off and thereby the heat-sealable material laminated thereon is also peeled off, by which the film loses the protecting functions. On the contrary, since the polyester film of the present invention has an excellent adhesion with the printing ink, even when the conventional printing ink for cellulose films is used, the printing ink layer is not peeled off from the base film by the boiling treatment.

The polyester film of the present invention has a more excellent adhesion with other films in comparison with the conventional polyester films, and therefore can be laminated with other films and further a heat-sealing layer can be laminated thereon. The laminate film is useful as the packaging material of foods or other materials. Moreover, a laminate film of the present polyester film with the conventional polyester film (e.g. polyethylene terephthalate film) is particularly useful as the packaging materials because it has an improved printability without losing the properties of the conventional polyester film per se.

When the block copolyester consists of a crystalline polyester segment having a high melting point composed by a residue of terephthalic acid and a residue of a glycol and a soft polymer segment having a low melting point composed by polytetramethylene oxide glycol, the obtained polyester film shows particulary excellent printability and transparency. Particularly preferred block copolyster is polyethylene terephthalate-polytetramethylene oxide block copolymer and polytetramethylene terephthalate-polytetramethylene oxide block copolymer from the practical viewpoint.

When the soft polymer segment having a low melting point in the block copolyester consists of a polyethylene oxide repeating unit or a polyethylene oxide.polypropylene oxide repeating unit having a large content of ethylene oxide, the polyester film made using such a block copolyester shows excellent antistatic properties in addition to the above-mentioned characteristics. Particularly preferred one is polyethylene terephthalate-polyethylene oxide block copolymer from the practical viewpoint.

The properties of the polyester film are measured as follows:

1. Transparency:

It is measured by the method described in the provision of JIS K-6714.

2. Pinhole resistance:

The film is fixed onto the top of a glass tube having a diameter of 10 mm in a bag-like shape and the glass tube is given by a pressure of 1 $kg/cm^2$ and then a reduced pressure (vacuum), which operations are repeated in the rate of 10 times/ minute. The number of the operations is counted till pinholes occur.

3. Antistatic properties:

It is measured at the atmospheres of 20° C and a relative humidity (RH) of 65 % using Static Honest Meter (made by Shishido Shokai). The voltage (10,000 V) is charged on the test sample from the height of 15 mm. The damping curve of the charged voltage is depicted and the time until the initially charged voltage becomes ½ (half-time) and the residual voltage when it becomes parallel are measured.

4. Number of the broken bags:

Polyethylene film (thickness: 40 μ) is subjected to an extrusion lamination by a conventional method and the resultant is formed into a bag (width: 10 cm, length: 15 cm). To the bag is added water (180 cc) and then the bag is heatsealed. 20 bags are packed into a cardboard box with least space, and the box is fallen down from the height of one meter which is repeated 20 times, and then the number of the broken bags is counted.

5. Heat treatment at a high temperature:

The film or bag is dipped in hot water at 135° C under a pressure for 30 minutes and thereafter they are subjected to the above tests.

6. Adhesion (adhesion force between the film layer and the printing ink layer):

a. Peeling of tape

The commercially available adhesive-backed tape (Cellophane tape, trade name of Sekisui Kagaku Kogyo) is put on the printing ink layer without the occurrence of bubbles, and then the tape is rapidly peeled off. The state of the printing ink layer is observed and evaluated as follows:

◎: The printing ink layer is not entirely peeled off. Excellent adhesion

○ : The printing ink layer is almost not peeled off (less than 10 %). Good adhesion Δ: The printing ink layer is peeled off about 10 to 50 %. Not good adhesion X: The printing ink layer is almost completely (more than 50 %) peeled off. Bad adhesion b. Rubbing The printed film is rubbed 5 to 6 times between fingers wherein the printing ink layer is put innerside, and then the state of the printing ink layer is observed and evaluated in the same manner as in the above (a).

c. Scratching

The printed film is put on a cardboard (thickness: 1 mm) so that the printing ink layer becomes upside, and the printing ink layer is scratched with nails, and then the state of the printing ink layer is observed and evaluated as follows:

◎ : The printing ink layer is not entirely peeled off. Excellent adhesion

○ : The printing ink layer is almost not peeled off. Good adhesion

Δ: The printing ink layer is somewhat peeled off. Not good adhesion

X: The printing ink layer is readily peeled off. Bad adhesion

7. Peel strength test of laminate:

The test sample is cut in a width of 15 mm and is subjected to the peel strength test at a speed of 200 mm/minute and at an angle of 90°. The peel strength is shown in "g/15 mm".

The polyester film of the present invention may be subjected to a heat treatment or a corona discharge treatment after drawing. In case of the blending of the terephthalic polyester and the block copolyester, any other additives, such as antioxidants, ultraviolet absorbents, lubricating agents, pigments or the like may be added thereto.

The drawn polyester film of the present invention has an excellent transparency and further improved flexing resistance and pinhole resistance, while the polyester film made from the terephthalic polyester alone has inferior flexing resistance and pinhole resistance. The polyester film of the present invention is particularly superior in the pinhole resistance in comparison with the polyester film made from the terephthalic polyester alone. Moreover, the present polyester film has an excellent printability and can be printed with the conventional printing ink for cellulose films.

The present invention is illustrated by the following Examples but is not limited thereto, wherein "part" is part by weight.

EXAMPLE 1

Dimethyl terephthalate (83 parts), 1,4-butanediol (110 parts), polytetramethylene oxide glycol (molecular weight: 2,000, 215 parts), an antioxidant (Ionox 330, made by Shell Chemical Co., 0.6 part) and tetra-n-butyl titanate (as a catalyst, 0.03 part) are charged into an autoclave. The mixture is subjected to transesterification under heating with agitation and then is polycondensed to give polytetramethylene terephthalate-polytetramethylene oxide block copolymer.

The block copolymer thus obtained (5% by weight) is blended with polyethylene terephthalate (intrinsic viscosity: 0.60, 95% by weight) and the polymer mixture a blend is subjected to a melt extrusion to give a non-drawn film (thickness: 120 μ). The non-drawn film is drawn 3.3 times perpendicularly at 85° C and 3.2 times laterally at 98° C and the resultant is set by heating at 210° C for 10 seconds to give a biaxially drawn film (thickness: 12.2 μ) having excellent transparency and dimensional stability and further other excellent properties as mentioned in Table 1.

For the comparison (Reference Example 1), a biaxially drawn polyethylene terephthalate film (thickness: 12 μ) is prepared by using the same polyethylene terephthalate in the same manner as described above. The properties of this film are also shown in Table 1.

Table 1

|  | Product of Example 1 | Product of Reference Example 1 |
| --- | --- | --- |
| Thickness (average) | 12.2 μ | 12.3 μ |
| Transparency | 94 % | 95 % |
| Pinhole resistance |  |  |
| Treatment at room temperature | 750 times | 280 times |
| After heat-treatment (135° C, 30 min.) | 700 times | 70 times |
| Number of broken bags |  |  |
| Treatment at room temperature | 0 | 3 |
| After heat-treatment (135° C, 30 min.) | 0 | 7 |

EXAMPLE 2

Nitrocellulose (viscosity: ⅛ seconds, nitration degree: 11.2%, 200 parts) and dibutyl phthalate (50 parts) are dissolved in a mixed solvent consisting of methanol (200 parts), toluene (50 parts) and ethyl acetate (200 parts) and titanium white (300 parts) are added thereto to give a printing ink.

The polyester film obtained in Example 1 is subjected to a corona discharge treatment and the surface of the polyester film thus treated is wholly printed with the printing ink prepared above using a rotogravure roll of 150 mesh and then dried at 100° C for 10 seconds. For reference, the biaxially drawn polyethylene terephthalate film of Reference Example 1 is printed likewise. The printability (adhesion between the film and the printing ink layer) of these films are shown in Table 2.

Table 2

|  | Peeling of tape | | Rubbing | | Scratching | |
| --- | --- | --- | --- | --- | --- | --- |
|  | A | B | A | B | A | B |
| The product of Example 1 | ◎ | ○ | ◎ | ○ | ◎ | ○ |
| The product of Reference Example 1 | X | X | Δ | X | Δ | X |

[Note]:
A : Before the boiling treatment
B : After the boiling treatment

As is made clear from the above results, the polyester film of the present invention has an excellent adhesion with the printing ink, and even after the boiling treatment, the printing ink layer is almost not peeled off, and on the contrary, the film of the Reference Example 1 shows insufficient adhesion with the printing ink even before the boiling treatment.

EXAMPLE 3

An isocyanate anchor coating agent consisting of Adcoat 503 H (made by Toyo Ink Seizo K.K., 100 parts), ethyl acetate (130 parts) and a catalyst F (made by Toyo Ink Seizo K.K., 6.5 parts) is applied to the polyester film obtained in Example 1 by a rotogravure roll of 120 mesh so that the solid materials in dry state is 2 g/m², and the film thus treated is laminated with a polyethylene film having a low density (thickness: 50 μ) under pressure using a heat roll of 60° C and then the resultant is curred for 72 hours. For reference, the polyethylene terephthalate film of Reference Example 1 is treated in the same manner as described above. These laminate films thus obtained are subjected to the peel strength test and the results are shown in Table 3.

Table 3

|  | Peel strength (g/15 mm) | |
| --- | --- | --- |
|  | Before the boiling treatment | After the boiling treatment |
| The product of Example 1 | More than 300 | More than 350 |
| The product of Reference Example 1 | 50 | 20 |

EXAMPLE 4

In the same manner as described in Example 1, a block copolyester (terephthalic acid : polytetramethylene oxide glycol = 7 : 1 by mol) is produced. The block copolyester thus obtained is blended with polyethylene terephthalate so that the content of the block copolyester is 8% by weight on the basis of whole weight of the polymer blend, from which a biaxially drawn film is obtained likewise. The biaxially drawn film of this Example is compared with the reference films of the following Reference Examples:
  Reference Example 2: Biaxially drawn nylon-6 film (thickness: 15 μ)
  Reference Example 3: Biaxially drawn polypropylene film (thickness: 22 μ)
  Reference Example 4: Biaxially drawn polyethylene terephthalate film (thickness: 12 μ)
The results are shown in Table 4.

As is made clear from the above results, the films in the Reference Examples all show the increase of the pinhole and number of broken bags after the heat treatment, but the film of the present invention tolerates enough the heat treatment.

EXAMPLE 5

The same nitrocellulose as used in Example 2 (100 parts), a polyamide resin (a condensate of dimer of linoleic acid with ethylene diamine, molecular weight: 8,000, softening point: 110° C, 130 parts) and a copolyester [a linear copolyester consisting of acid components (terephthalic acid residue: 80% by mol, and sebacic acid residue: 20% by mol) and glycol components (ethylene glycol: 60% by mol, and neopentyl glycol: 40% by mol), 20 parts] are dissolved in a mixed solvent consisting of ethyl acetate (50 parts), methanol (20 parts), isopropyl alcohol (100 parts), toluene (250 parts) and methyl ethyl ketone (30 parts) and thereto is added titanium white (300 parts) to give a printing ink.

The polyester film obtained in Example 4 is subjected to a corona discharge treatment and the surface of the polyester film thus treated is wholly printed with the printing ink prepared above in the same manner as described in Example 2. The adhesion between the film and the printing ink layer is tested, which results are shown in Table 5.

A polyethylene film having a low density (thickness: 50 μ) is dry-laminated on the printing ink layer of the film obtained above in the same manner as described in Example 3, and the peel strength thereof is also tested, which results are also shown in Table 5.

The films of Reference Examples 2, 3 and 4 are treated in the same manner as described above and the resultants are tested likewise, which results are also shown in Table 5.

Table 4

|  | Product of Example 4 | Product of Reference Example 2 | Product of Reference Example 3 | Product of Reference Example 4 |
| --- | --- | --- | --- | --- |
| Pinhole resistance |  |  |  |  |
| Treatment at room temperature | More than 1000 times | More than 1000 times | More than 1000 times | 300 times |
| After heat-treatment (135° C, 30 min.) | More than 1000 times | 150 times | 300 times | 250 times |
| Number of broken bags |  |  |  |  |
| Treatment at room temperature | 0 | 0 | 0 | 2 |
| After heat-treatment (135° C, 30 min.) | 0 | 18 | 15 | 8 |

Table 5

|  | Adhesion between the film and the printing ink layer | | | | | | Peel strength of the laminate films | |
| --- | --- | --- | --- | --- | --- | --- | --- | --- |
|  | Peeling of tape | | Rubbing | | Scratching | | | |
|  | A | B | A | B | A | B | A | B |
| The product of Example 5 | ⊚ | ○ | ⊚ | ○ | ⊚ | ○ | More than 350 times | More than 350 times |
| The product of Reference Example 2 | X-Δ | X | Δ | X | X | X | 35 | 15 |
| The product of Reference Example 3 | X | X | X | X | X | X | 11 | 10 |
| The product of Reference | X | X | Δ | X | Δ | X | 50 | 21 |

EXAMPLE 6

Polyethylene terephthalate (intrinsic viscosity: 0.61, 72% by weight) is blended with polytetramethylene terephthalate-polytetramethylene oxide block copolymer (terephthalic acid : polytetramethylene oxide glycol = 9 : 1 by mol, 28% by weight), which is produced by the polycondensation of dimethyl terephthalate, 1,4-butanediol and polytetramethylene oxide glycol (molecular weight: 1,000), to give the starting polymer blend.

The polymer blend thus obtained is subjected to a melt extrusion to give a non-drawn film (thickness: 120 $\mu$), followed by drawing the resultant 3.2 times perpendicularly at 84° C and 3.3 times laterally at 95° C and heat-treating the resultant at 200° C for 10 seconds. The biaxially drawn film thus obtained (thickness: 12 $\mu$) shows extremely excellent pinhole resistance and printability.

The characteristics of the film and the test results thereof are shown below.

| | |
|---|---|
| Thickness (average): | 12.0 $\mu$ |
| Transparency: | 90 % |
| Pinhole resistance: | |
| Treatment at room temperature: | More than 1,000 times |
| After heat-treatment at a high temperature: | More than 1,000 times |
| Number of broken bags: | |
| Treatment at room temperature: | 0 |
| After heat-treatment at a high temperature: | 0 |

EXAMPLE 7

The polyester film obtained in Example 6 is printed in the same manner as described in Example 2 and the adhesion between the film and the printing ink layer is measured. Besides, the film is dry-laminated with polyethylene film in the same manner as described in Example 3 and the peel strength thereof is measured. These results are shown in Table 6.

Table 6

| | Adhesion between the film and the printing ink layer | | | Peel strength of the laminate films |
|---|---|---|---|---|
| | Peeling of tape | Rubbing | Scratching | |
| Before the boiling treatment | ⊚ | ⊚ | ⊚ | 275 |
| After the boiling treatment | ○ | ○ | ○ | 200 |

EXAMPLE 8

Bishydroxyethyl terephthalate (400 parts), polyethylene oxide glycol (molecular weight: 4,000, 400 parts), antimony trioxide (0.4 part), zinc acetate (0.4 part) and an antioxidant (Ionox 330, made by Shell Chemical Co., 1.6 parts) are charged into a reactor which is heated at 200° C and the air therein is replaced by nitrogen. The mixture is gradually heated with agitation for about one hour to 275° C. During this procedure, the pressure therein is gradually reduced to about 0.1 mmHg. The mixture is further reacted under a reduced pressure of 0.1 mmHg for 30 minutes.

Chips of the block copolyester thus obtained (the copolymerization ratio of the polyethylene oxide segment: 50% by weight) are blended with polyethylene terephthalate (intrinsic viscosity: 0.62) in various proportions. The mixture is subjected to a melt extrusion with an extruder (diameter of screw: 20 mm) provided with a T-die and is cooled at a temperature of the cooling roll of 80° C to give a non-drawn film (thickness: 250 $\mu$). The resulting non-drawn film is drawn 3.5 times perpendicularly at 90° C and further 3.5 times laterally at 90° C and the resultant is set by heating at 200° C for 30 seconds.

For the comparison (Reference Example 5), the polyethylene terephthalate (intrinsic viscosity: 0.62) alone is subjected to the melt extrusion, drawn biaxially and then set in the same manner as described above.

On these films thus obtained, the transparency, the pinhole resistance and the antistatic properties are measured. The results are shown in Table 7. As is made clear from the results, the biaxially drawn film incorporated with the block copolyester containing polyethylene oxide glycol shows excellent transparency, pinhole resistance and antistatic properties.

Table 7

| Content of polyethylene oxide glycol in the mixed polymer (% by weight) | Transparency (%) | Pinhole resistance (times) | Antistatic properties | | |
|---|---|---|---|---|---|
| | | | Initially charged voltage (V) | Half-time (sec.) | Residual voltage (V) |
| 0 (Reference Example 5) | 88.0 | 300 | 0.46 | >400 | 0.40 |
| 2 | 88.0 | 600 | 0.44 | 365 | — |
| 3 | 87.0 | 480 | 0.43 | 315 | — |
| 4 | 86.7 | 450 | 0.43 | 363 | — |

EXAMPLE 9

Table 9

| Added copolymer | | Content of polyethylene oxide glycol in the mixed polymer (% by weight) | Transparency (%) | Pinhole resistance (times) | Antistatic properties | | |
|---|---|---|---|---|---|---|---|
| Molecular weight of polyethylene oxide glycol | Ratio of polyethylene oxide glycol (% by weight) | | | | Initially charged voltage (V) | Half-time (sec.) | Residual voltage (V) |
| — | — | 0 | 88.0 | 300 | 0.48 | >400 | 0.44 |
| 2000 | 20 | 3 | 88.5 | 480 | 0.44 | 375 | — |
| 2000 | 70 | 3 | 83.7 | >1000 | 0.41 | 180 | — |
| 4000 | 20 | 3 | 88.7 | 720 | 0.44 | 335 | — |
| 4000 | 75 | 2 | 85.2 | 910 | 0.44 | 294 | — |
| 4000 | 75 | 3 | 82.5 | >1000 | 0.43 | 190 | — |
| 4000 | 75 | 4 | 81.8 | >1000 | 0.35 | 70 | — |
| 4000 | 75 | 7.5 | 78.9 | >1000 | 0.30 | 3.8 | — |

The polyester film obtained in Example 8 (the content of polyethylene oxide glycol: 4% by weight) is printed in the same manner as described in Example 2 and the adhesion between the film and the printing ink layer is measured.

Besides, a mixture of an alkyl titanate anchor coating agent (EL-110, made by Toyo Ink Seizo K.K., 100 parts) and toluene (400 parts) is applied to one side of the polyester film obtained in Example 8 in a coating amount of 0.8 g/cm² by a rotogravure roll of 150 mesh and dried, and thereon is laminated a polyethylene having a low density (melt index: 7 g/10 minutes) by melt extrusion. The peel strength of the laminate film is also measured.

These results shown in Table 8.

Table 8

| | Adhesion between the film and the printing ink layer | | | Peel strength of the laminate films |
|---|---|---|---|---|
| | Peeling of tape | Rubbing | Scratching | |
| Before the boiling treatment | ○ | ⊙ | ○ | 350 |
| After the boiling treatment | ○ | ○ | ○ | — |

EXAMPLE 10

In the same manner as described in Example 8, films are produced from a polymer blend incorporated with polyethylene terephthalate-polyethylene oxide block copolyesters (molecular weight of the polyethylene oxide glycol: 2,000 and 4,000), wherein the ratio of the components in the copolymer is varied.

On the films thus obtained, the various properties are measured likewise. The results are shown in Table 9. As is made clear from the results, the polyester film incorporated with polyethylene oxide glycol block copolyester shows excellent transparency, impact resistance and pinhole resistance and further improved antistatic properties.

EXAMPLE 11

The polyester film obtained in Example 10 is printed in the same manner as described in Example 2 and the adhesion between the film and the printing ink layer is measured. Besides, the film is dry-laminated with polyethylene film in the same manner as described in Example 3 and the peel strength thereof is measured. These results are shown in Table 10.

Table 10

| Added copolymer | | | Adhesion between the film and the printing ink layer | | | | | | Peel strength of the laminate films | |
|---|---|---|---|---|---|---|---|---|---|---|
| Molecular weight of polyethylene oxide glycol | Ratio of polyethylene oxide glycol (% by weight) | Addition amount (% by weight) | Peeling of tape | | Rubbing | | Scratching | | | |
| | | | A | B | A | B | A | B | A | B |
| — | — | 0 | X | X | △ | X | △ | X | 42 | 16 |
| 2000 | 20 | 3 | △ | △ | ○ | ○ | ○ | ○ | | |
| 2000 | 70 | 3 | ○ | ○ | ⊙ | ○ | ○ | ○ | 150 | 120 |
| 4000 | 20 | 3 | ○-△ | △ | ○ | ○ | ○ | ○ | | |
| 4000 | 75 | 2 | ○-△ | △ | ○ | ○ | ○ | ○ | | |
| 4000 | 75 | 3 | ○ | ○ | ⊙ | ○ | ○ | ○ | | |
| 4000 | 75 | 4 | ○ | ○ | ⊙ | ○ | ⊙ | ○ | 270 | 220 |
| 4000 | 75 | 7.5 | ⊙ | ○ | ⊙ | ○ | ⊙ | ○ | 210 | 190 |

What is claimed is:

1. A stretched polyester film made from a polymer blend comprising (i) a polyester consisting essentially of a residue of dibasic acids wherein at least 80% by mole thereof is terephthalic acid and a residue of at least one glycol and (ii) a block copolyester consisting of a crystalline polyester segment having a high melting point and a soft polymer segment having a low melting point and a number average molecular weight of 400 to 8,000, said soft polymer segment having a low melting point being present in an amount of 0.5 to 10% by weight on the basis of the whole weight of the mixed polymer, and said crystalline polyester segment having a melting point of at least 170° C. when a polymer is produced by the monomers composing this segment alone and said soft polymer segment having a melting or softening point of 100° C. or lower, said film being drawn at least uniaxially in a ratio of 1.2 to 6.

2. The stretched polyester film according to claim 1, wherein the residue of at least one glycol is a residue of ethylene glycol.

3. The stretched polyester film according to claim 1, wherein the crystalline polyester segment having a high melting point is a segment comprising predominantly a polyester consisting of a residue of terephthalic acid and a residue of ethylene glycol.

4. The stretched polyester film according to claim 1, wherein the crystalline polyester segment having a high melting point is a segment comprising predominantly a polyester consisting of a residue of terephthalic acid and a residue of tetramethylene glycol 5. The stretch polyester film according to claim 1, wherein the soft polymer segment having a low melting point is a segment comprising predominantly polyethylene oxide.

6. The stretched polyester film according to claim 1, wherein the soft polymer segment having a low melting point is a segment comprising predominantly polytetramethylene oxide.

7. The stretched polyester film according to claim 1, wherein the block copolyester contains the soft polymer segment having a low melting point in the ratio of 5 to 95% by weight.

8. The stretched polyester film according to claim 1, wherein the block copolyester is a polyethylene terephthalate-polyethylene oxide block copolymer.

9. The stretched polyester film according to claim 1, wherein the block copolyester is a polyethylene terphthalate-polytetramethylene oxide block copolymer.

10. The stretched polyester film according to claim 1, wherein the block copolyester is a polytetramethylene terephthalatepolytetramethylene oxide block copolymer.

11. The stretched polyester film according to claim 1, wherein the soft polymer segment is present in an amount of 0.5 to 5% by weight on the basis of the whole weight of the mixed polymer.

12. The stretched polyester film according to claim 1, wherein the mixed ratio of the polyester and the block copolyester is in the range of 99.4 : 0.6 to 20 : 80 by weight.

13. The stretched polyester film according to claim 1, which is drawn at least uniaxially in a ratio of 1.5 to 6.

14. The stretched polyester film according to claim 1, which is drawn biaxially in the ratio of 1.2 to 6 perpendicularly and in the ratio of 1.2 to 6 laterally.

* * * * *